(12) United States Patent
Ingram

(10) Patent No.: US 9,974,299 B1
(45) Date of Patent: May 22, 2018

(54) BIRD NEST PREVENTION DEVICE AND METHOD

(71) Applicant: Dustin Duane Ingram, Arcola, IL (US)

(72) Inventor: Dustin Duane Ingram, Arcola, IL (US)

(73) Assignee: STURDI-BUILT BUILDINGS, LLC, Charleston, IL (US)

( * ) Notice: Subject to any disclaimer, the term of this patent is extended or adjusted under 35 U.S.C. 154(b) by 0 days. days.

(21) Appl. No.: 15/608,104

(22) Filed: May 30, 2017

(51) Int. Cl.
*A01K 3/00* (2006.01)
*A01M 29/32* (2011.01)
*E04B 1/72* (2006.01)
*A01M 29/30* (2011.01)

(52) U.S. Cl.
CPC .............. *A01M 29/32* (2013.01); *E04B 1/72* (2013.01); *A01M 29/30* (2013.01)

(58) Field of Classification Search
CPC ..... E04B 1/12; E04B 1/10; E04B 7/20; E04B 7/028; E04B 7/00; E04B 1/00; E04B 1/0038; E04D 12/008
USPC ... 52/101, 262, 92.2, 93.1, 92.1, 647, 649.2, 52/656.9, 696, 278, 90.1, 698, 712, 282.4, 52/272, 716.1, 746.11, 94, 95, 96, 57, 52/198, 302.1, 43
See application file for complete search history.

(56) References Cited

U.S. PATENT DOCUMENTS

| 2,272,910 A * | 2/1942 | Gobberdiel ............... E04B 1/08 52/262 |
| 3,004,640 A * | 10/1961 | Macomber ................ E04C 3/07 105/422 |
| 4,910,934 A * | 3/1990 | Hennings .............. E04B 1/2608 52/210 |
| 5,248,021 A * | 9/1993 | Nichols .................. A62B 35/04 182/3 |
| 5,326,318 A * | 7/1994 | Rotter .................. E04D 12/008 454/365 |
| 5,390,453 A * | 2/1995 | Untiedt ..................... E04C 3/07 52/478 |
| 5,553,685 A * | 9/1996 | Cook .................. A62B 35/0068 182/3 |
| 5,730,407 A * | 3/1998 | Ostrobrod .......... A62B 35/0043 182/231 |
| 7,774,990 B1 * | 8/2010 | Castellanos ........... E04D 12/008 52/198 |
| 9,157,237 B2 * | 10/2015 | Johnson ................ E04D 12/008 |

\* cited by examiner

*Primary Examiner* — Chi Q Nguyen
(74) *Attorney, Agent, or Firm* — R. William Graham

(57) ABSTRACT

A bird nest prevention device for use in a building structure includes a mounting face for connecting to a face of a truss by a connector, a first angled portion having a lower edge connecting to an upper edge of the mounting face and being inclined upward therefrom, a second angled portion having a lower edge opposing the lower edge of the first inclined portion and being inclined upward therefrom, an upward extending portion connecting at a lower portion thereof to the first angled portion and the second angled portion and wherein the lower edges form a stand to rest on top of the truss.

13 Claims, 3 Drawing Sheets

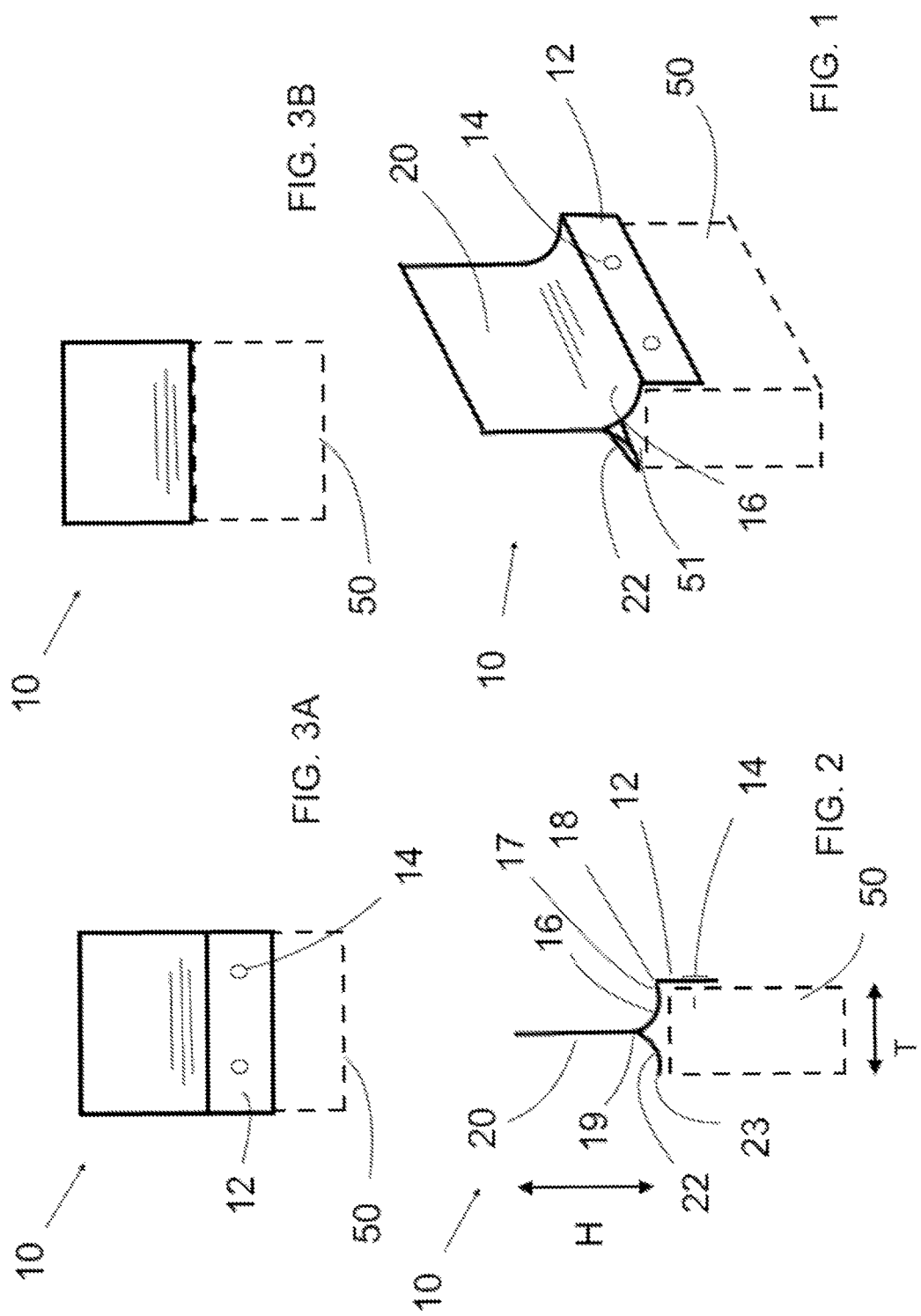

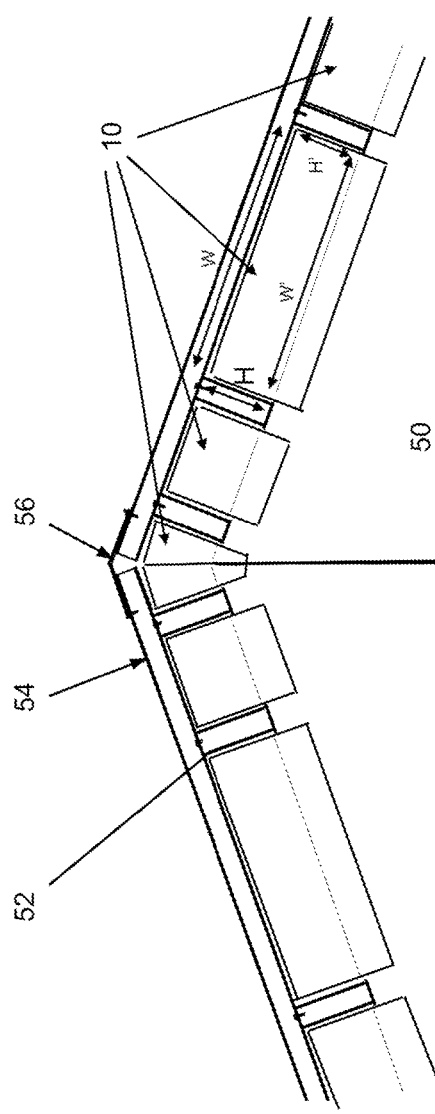
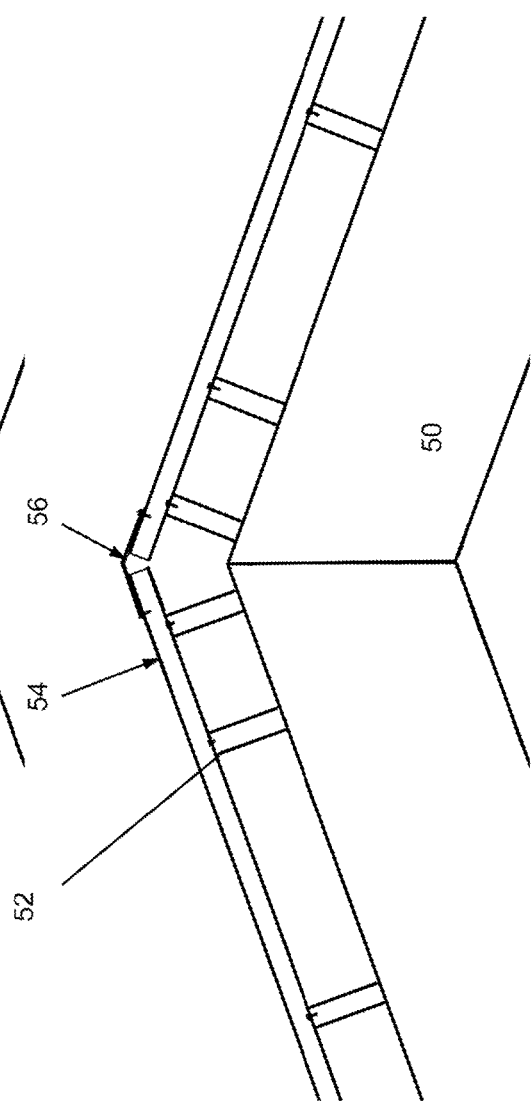

BIRD NEST PREVENTION DEVICE AND METHOD

FIELD OF THE INVENTION

The field of the invention is bird deterrent devices and method of preventing nesting.

BACKGROUND OF THE INVENTION

There exist many bird deterrent devices which use a sloped surface to deter birds from nesting on a surface. For example, these range from spiked surfaces to sloped surfaces of sufficient degree of slope and minimal surface tack.

While there are many prior deterrent devices which exist, none of the prior known devices are particularly well suited for every application due to the environment to which they are deployed. For example, current methods for preventing bird nests in pole barns include filling gaps by cutting 2×4's to length and then toe nailing or screwing in place above truss members between perlings. This is time consuming and expensive taking several days time in most cases. Thus, there is a need for a bird deterrent device that can be suitably deployed in a pole barn application.

SUMMARY OF THE INVENTION

It is an object to provide a bird deterrent device.

It is an another object to provide a method and a device in which an improved bird deterrent can be used in a building structure having a transverse support securing across a rafter particularly in a pole barn application.

Still another object of the invention is provide an inexpensive bird nest prevention device.

Accordingly, the instant invention is directed to a bird nest prevention device for use in pole barn or like structures. In such structures, there are typically transverse 2×4's secured across the rafters or the trusses to which the roof is secured.

The bird nest prevention device includes a mounting face which can be fixed to a face of truss by a nail or screw. A first curved or angled portion has a lower edge connecting generally normal to an upper edge of the mounting face and is inclined upward from the lower edge thereof. A second curved or angled portion has a lower edge opposing the lower edge of the first inclined portion and is inclined upward from the lower edge thereof. An upward extending portion connects at a lower portion thereof to the first angled portion and the second angled portion. The lower edges of the angled portions form a stand to rest on top of an upper edge of the truss. Collectively, the angled portions generally span a thickness of the truss.

A distance from a bottom of curved portions to top of a generally upward planar portion provides a height which is proximate a gap height formed between a top of the rafter and an under side of the roof. In an alternative embodiment, the device includes a base portion connecting bottom edges of curved portions.

Another aspect of the invention is directed a method of preventing birds from nesting in a building structure having a transverse support securing across a rafter to which a roof is secured. The method includes providing a bird nest prevention device having a mounting face for connecting to a face of a truss by a connector, a first angled portion having a lower edge connecting generally normal to an upper edge of the mounting face and being inclined upward from the lower edge thereof, a second angled portion having a lower edge opposing the lower edge of the first inclined portion and being inclined upward from the lower edge thereof, an upward extending portion connecting at a lower portion thereof to the first angled portion and the second angled portion and wherein the lower edges form a stand to rest on top of the rafter. Further, the method includes placing the device on top of the rafter such that the lower edges stand on top of the rafter and the mounting face is flush to the rafter and securing the mounting face to the rafter using one of a nail and screw.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIG. 1 is a perspective view a bird deterrent device of the instant invention.

FIG. 2 is an end view a bird deterrent device of FIG. 1.

FIG. 3A is a front side view a bird deterrent device of FIG. 1.

FIG. 3B is a back side view a bird deterrent device of FIG. 1.

FIG. 4 is a side view of part of a pole barn truss and roof.

FIG. 5 is a side view of part of a pole barn truss and roof with a bird deterrent of the instant invention operably disposed therein.

DETAILED DESCRIPTION

Figure 6:
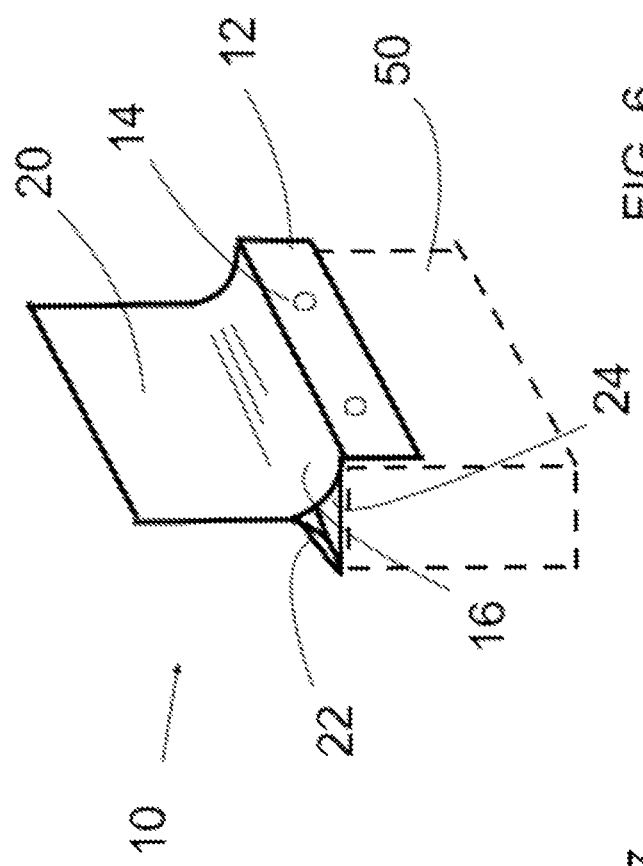
FIG. 6 is a perspective view another embodiment bird deterrent device of the instant invention.

Referring now to the drawings, first to FIG. 1, a bird nest prevention device of the instant invention is generally designated by the numeral 10. The bird nest prevention device 10 can preferably be made from a molded or extruded plastic material which can be transparent or opaque, though it is conceived other materials can be used such as metal. A preferred method is to provide an extrusion die having an open cavity configured to form the device 10 wherein the device 10 can be formed by cutting to length as desired and result in less waste.

The material should be rigid enough to maintain its structural molded form, yet preferably thin enough to permit the same to be easily sized by way of cutting to fit particular size openings between perlings 52 as illustrated in FIG. 5. The periling 52 is typically a 2×4 thickness and height (understanding these can vary) and is set on its edge on the truss 50 serving as a transverse connection for the trusses 50 as well as a nailer for the roof 54. The bird nest prevention device 10 includes a mounting face 12 which can be fixed to a truss or rafter 50 by means or nails or screws 14. A curved or angled portion 16 has a lower edge 17 and connects generally normal to an upper edge 18 of the mounting face 12 and is inclined upward to connect to a lower portion 19 of a generally upward extending planar portion 20. An opposing curved or angled portion 22 has a lower edge 23 also is inclined upward and connects to the lower portion 19 of upward extending planar portion 20. Collectively, the portions 16 and 22 preferably generally span a thickness T to cover a top or upper surface 51 the truss 50. The edges 17 and 23 serve as a stand for the device 10 on top surface 51 of the truss 50.

A distance from a bottom of portions 16 and 22 to top of portion 20 provides a height H which is proximate a gap height formed between a top of the rafter 50 and under side of roof 54. A roof ridge cap 56 connects the roof 54. The present invention provides a device which prevents birds from nesting on rafters 50.

Thus, a building structure is provided which includes a plurality of transverse support members or perlings, each adjacent transverse support members separated by a predetermined width W, the transverse support members securing across a truss and to which a roof is secured providing a predetermined gap height H between the truss and the roof, the curved portion and upward extending planar portion collectively spanning a width W' substantially equivalent the predetermined width W between the transverse support members and a height H' substantially equivalent the predetermined gap height H between the truss and the roof in a continuous manner such that there is no gap therein.

Figure 7:
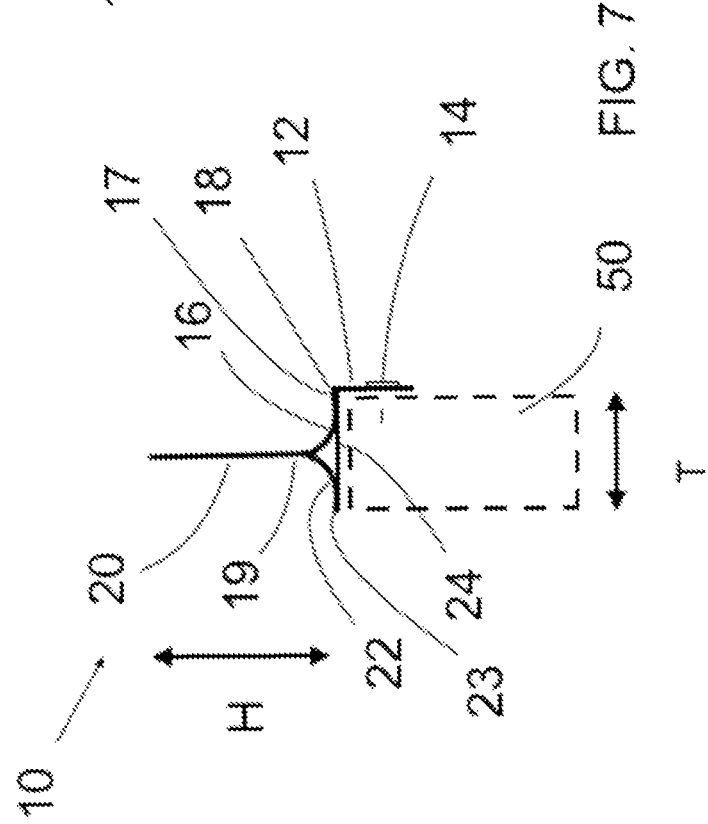
FIG. 7 is an end view a bird deterrent device of FIG. 6.

FIGS. 6 and 7 show and alternative embodiment wherein the device 10 includes a base portion 24 connecting bottom edge 17 and 23, respectively, of portions 16 and 22. This embodiment can provide additional rigidity though increase cost slightly.

By so providing, the device 10 is easily sized in its length. The device 10 can be easily handled as relatively lightweight and provides a much easier connection point to the truss 50. The upward extending planar portion 20 is flexible enough to permit the same to be slightly deformed should spacing so require. Optionally, this device 10 can be trimmed to fill odd size areas as seen adjacent the roof cap 56. It should be appreciated that the device 10 provide a quick and easy way to connect itself to the truss 50 and assure no nesting occurs. Further, the invention provides for a significant reduction in cost both in labor and material.

The curved or angled portions 16 and 22 can preferably have an angle sufficient to promote anything attempted to be stored thereon to slide off, for example, 30 degrees or greater should be sufficient so that birds will slide off faces of the device 10. The angle can vary depending upon the material used on the surface of the face. If the material of the face results in relatively little friction, the angle need not be as steep as when a less slippery material is used.

It is also envisioned that the mold could provide for score lines which could serve to reduce size if so desired to accommodate a particular area. By having a scored (i.e. perforated) breakaway, extendible portions can be easily removed thereby facilitating customization of the deterrent device 10 to a particular perching area.

While the particular embodiments are disclosed, it should be apparent to those skilled in the art that many more modifications, derivations and improvements which are possible without departing from the inventive concepts herein. The inventive subject matter is not to be restricted except in the spirit of the appended claims. In interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced.

What is claimed is:

1. A bird nest prevention device installed in a building structure which includes a plurality of transverse support members, each adjacent transverse support members separated by a predetermined width W, said transverse support members securing across a truss and to which a roof is secured providing a predetermined gap height H between the truss and the roof, which includes:
    a mounting face for connecting to a face of the truss by a connector;
    a first portion having a lower edge connecting generally normal to an upper edge of said mounting face and being inclined upward from said lower edge thereof;
    a second portion having a lower edge opposing said lower edge of said first inclined portion and being inclined upward from said lower edge thereof;
    an upward extending portion connecting at a lower portion thereof to said first portion and said second portion;
    said first portion, second portion, and said upward extending portion collectively spanning a width W' substantially equivalent the predetermined width W between the transverse support members and a height H' substantially equivalent the predetermined gap height H between the truss and the roof in a continuous manner such that there is no gap therein; and
    wherein said lower edges form a stand to rest on top of the truss.

2. The bird nest prevention device of claim 1, wherein upward extending portion is generally planar.

3. The bird nest prevention device of claim 1, wherein said first and said second portions span a thickness of the truss.

4. The bird nest prevention device of claim 1, which includes a base portion connecting said bottom edges of said first portion and said second portion.

5. The bird nest prevention device of claim 1, wherein said first portion and said second portion are curved.

6. The bird nest prevention device of claim 1, wherein said first portion and said second portion are angled.

7. A method of preventing birds from nesting in a building structure which includes a plurality of transverse support members, each adjacent transverse support members separated by a predetermined width W, said transverse support members securing across a truss and to which a roof is secured providing a predetermined gap height H between the truss and the roof, which includes the steps of:
    providing a bird nest prevention device having a mounting face for connecting to a face of a truss by a connector, a first angled portion having a lower edge connecting generally normal to an upper edge of said mounting face and being inclined upward from said lower edge thereof, a second angled portion having a lower edge opposing said lower edge of said first inclined portion and being inclined upward from said lower edge thereof, an upward extending portion connecting at a lower portion thereof to said first angled portion and said second angled portion, said first portion, second portion, and said upward extending portion collectively spanning a width substantially equivalent the predetermined width W' substantially equivalent the predetermined width W between the transverse support members and a height H' between the truss and the roof in a continuous manner such that there is no gap therein; and wherein said lower edges form a stand to rest on top of the truss;
    placing said device on top of the truss such that said lower edges stand on top of the truss and said mounting face is flush to a face of the truss; and
    securing the mounting face to the face of the truss using one of a nail and screw.

8. A bird nest prevention device installed in a building structure which includes:

a roof;

a truss;

a plurality of transverse support members, each pair of adjacent transverse support members separated by a predetermined width W, said transverse support members securing across said truss and to which said roof is secured providing a predetermined gap height H between said truss and said roof, wherein the bird nest prevention device includes:

a mounting face for connecting to a face of said truss by a connector;

a first portion having a lower edge connecting generally normal to an upper edge of said mounting face and being inclined upward from said lower edge thereof;

a second portion having a lower edge opposing said lower edge of said first inclined portion and being inclined upward from said lower edge thereof;

an upward extending portion connecting at a lower portion thereof to said first portion and said second portion;

said first portion, second portion, and said upward extending portion collectively spanning a width substantially equivalent the predetermined width W' substantially equivalent the predetermined width W between the transverse support members and a height H' between said truss and said roof in a continuous manner such that there are no gaps therein; and wherein said lower edges form a stand to rest on top of said truss.

9. The bird nest prevention device of claim 8, wherein upward extending portion is generally planar.

10. The bird nest prevention device of claim 9, wherein said first portion and said second portion are curved.

11. The bird nest prevention device of claim 8, wherein said first and said second portions span a thickness of the truss.

12. The bird nest prevention device of claim 11, wherein said first portion and said second portion are angled.

13. The bird nest prevention device of claim 8, which includes a base portion connecting said bottom edges of said first portion and said second portion.

* * * * *